United States Patent
Xiao et al.

(10) Patent No.: US 10,554,805 B2
(45) Date of Patent: Feb. 4, 2020

(54) INFORMATION PROCESSING METHOD, TERMINAL, AND COMPUTER-READABLE STORAGE MEDIUM

(71) Applicant: TENCENT TECHNOLOGY (SHENZHEN) COMPANY LIMITED, Shenzhen (CN)

(72) Inventors: Siyu Xiao, Shenzhen (CN); Xiaoyu Yu, Shenzhen (CN); Mengsha Zhou, Shenzhen (CN); Jiongchao Lin, Shenzhen (CN); Libin Ren, Shenzhen (CN); Yongjie Li, Shenzhen (CN); Yi Gao, Shenzhen (CN)

(73) Assignee: TENCENT TECHNOLOGY (SHENZHEN) COMPANY LIMITED, Guangding P.R., Shenzhen (CN)

(*) Notice: Subject to any disclaimer, the term of this patent is extended or adjusted under 35 U.S.C. 154(b) by 4 days.

(21) Appl. No.: 15/656,155

(22) Filed: Jul. 21, 2017

(65) Prior Publication Data

US 2017/0324859 A1    Nov. 9, 2017

Related U.S. Application Data

(63) Continuation of application No. PCT/CN2016/072412, filed on Jan. 27, 2016.

(30) Foreign Application Priority Data

Feb. 10, 2015    (CN) .......................... 2015 1 0069810

(51) Int. Cl.
     *H04W 4/00*        (2018.01)
     *H04M 1/725*      (2006.01)
     (Continued)

(52) U.S. Cl.
CPC ........ *H04M 1/72555* (2013.01); *H04L 51/10* (2013.01); *H04L 51/34* (2013.01); *H04W 4/12* (2013.01); *H04L 51/063* (2013.01)

(58) Field of Classification Search
CPC ..... H04L 12/5895; H04L 51/10; H04L 51/34; H04L 51/08; H04L 51/063; H04L 51/066;
(Continued)

(56) References Cited

U.S. PATENT DOCUMENTS 7,913,176 B1 *    3/2011    Blattner ................. H04L 51/04
                                                              715/758
8,131,816 B2      3/2012    Robinson
(Continued)

FOREIGN PATENT DOCUMENTS

CN        1965314 A      5/2007
CN      102770862 A    11/2012
(Continued)

OTHER PUBLICATIONS

International Search Report in international application No. PCT/CN2016/072412, dated Apr. 28, 2016.
(Continued)

*Primary Examiner* — Khoi H Tran
*Assistant Examiner* — B M M Hannan
(74) *Attorney, Agent, or Firm* — Sughrue Mion, PLLC

(57) ABSTRACT

An association logic that associates a non-text message type with specified information is established. The association logic includes at least identification of the non-text message type, allowing a message type in line with the association logic to be identified by the identification. A first message is monitored. A first identification corresponding to the first message is obtained by analysing the first message. It is detected, according to the first identification, whether the first message is of the message type in line with the
(Continued)

association logic. It is determined that the first message supports display of the specified information when it is detected that the first message is of the message type in line with the association logic.

20 Claims, 6 Drawing Sheets

(51) Int. Cl.
*H04L 12/58* (2006.01)
*H04W 4/12* (2009.01)

(58) Field of Classification Search
CPC ......... H04M 1/72552; H04M 1/72555; H04W 4/12; H04W 4/14
USPC ........................................................ 455/466
See application file for complete search history.

(56) References Cited

U.S. PATENT DOCUMENTS

| | | | |
|---|---|---|---|
| 8,255,810 B2* | 8/2012 | Moore | G06F 3/04817 715/752 |
| 2004/0111475 A1 | 6/2004 | Schultz | |
| 2004/0179037 A1* | 9/2004 | Blattner | G06T 13/40 715/751 |
| 2005/0234883 A1 | 10/2005 | Szeto | |
| 2007/0036128 A1* | 2/2007 | Mori | H04M 1/576 370/352 |
| 2008/0162438 A1 | 7/2008 | Szeto | |
| 2011/0137895 A1 | 6/2011 | Petrou | |
| 2011/0294467 A1* | 12/2011 | Kim | G06F 1/1643 455/411 |
| 2012/0105358 A1 | 5/2012 | Momeyer | |
| 2013/0060875 A1* | 3/2013 | Burnett | H04N 21/4788 709/206 |
| 2014/0324414 A1 | 10/2014 | Zhang et al. | |
| 2014/0344707 A1 | 11/2014 | Zhang et al. | |
| 2015/0162003 A1* | 6/2015 | Zhai | H04L 51/066 704/235 |
| 2017/0324693 A1 | 11/2017 | Xiao et al. | |

FOREIGN PATENT DOCUMENTS

| | | |
|---|---|---|
| CN | 102779304 A | 11/2012 |
| CN | 103095553 A | 5/2013 |
| CN | 103201714 A | 7/2013 |
| CN | 103634700 A | 3/2014 |
| CN | 103647696 A | 3/2014 |
| CN | 104125139 A | 10/2014 |
| CN | 104579934 A | 4/2015 |
| CN | 104615747 A | 5/2015 |
| WO | 2014176803 A1 | 11/2014 |

OTHER PUBLICATIONS

English Translation of the Written Opinion of the International Search Authority in international application No. PCT/CN2016/072412, dated Apr. 28, 2016.
Notification of the First Office Action of Chinese application No. 201510069810.7, dated Feb. 3, 2016.
English translation of Notification of the First Office Action of Chinese application No. 201510069810.7, dated Feb. 3, 2016.
International Search Report in international application No. PCT/CN2016/072503, dated Apr. 28, 2016.
English Translation of the Written Opinion of the International Search Authority in international application No. PCT/CN2016/072503, dated Apr. 28, 2016.
English Translation of the Notification of the First Office Action of Chinese application No. 201510073990.6 , dated Dec. 17, 2015.

* cited by examiner

INFORMATION PROCESSING METHOD, TERMINAL, AND COMPUTER-READABLE STORAGE MEDIUM

CROSS REFERENCE TO RELATED APPLICATIONS

This is a continuation application of International Patent Application No. PCT/CN2016/072412, filed on Jan. 27, 2016, which claims priority to Chinese Application No. 201510069810.7 filed on Feb. 10, 2015, both disclosures being incorporated herein by reference in their entirety.

BACKGROUND

The following technical problems emerge in related art.

With development of internet technology, there comes an era of big data when massive amounts of information constantly spring up. To match a demand for information sharing by public, information is processed with existing technology based on a social networking tool such as WeChat, Microblogging, etc. A great amount of information will be shared in a social network, with the shared information being displayed in increasingly diversified forms. In one scene, display of specified information is triggered by searching for a key word input by a user.

Such a mode of display based on key word search is supported only when a user inputs a plain text message, and is not supported for a great number of non-text message types. However, various message types are available on a terminal. Accordingly, key word search based information display has a limited scope of application, failing to meet increasingly diversified user demands for displaying shared information. No effective solution to such problems exists in related art.

SUMMARY

The disclosure relates to communication technology, and in particular to an information processing method, a terminal, and a computer-readable storage medium.

In view of this, embodiments herein provide an information processing method, a terminal, and a computer-readable storage medium capable of solving at least a problem in existing art.

A technical solution according to an embodiment herein may be implemented as follows.

According to an embodiment herein, an information processing method includes:

establishing, by a terminal, an association logic that associates a non-text message type with specified information, the association logic including at least identification of the non-text message type, allowing a message type in line with the association logic to be identified by the identification;

monitoring, by the terminal, a first message;

obtaining, by the terminal, a first identification corresponding to the first message by analysing the first message;

detecting, by the terminal according to the first identification, whether the first message is of the message type in line with the association logic;

determining, by the terminal, that the first message supports display of the specified information when it is detected that the first message is of the message type in line with the association logic.

A terminal according to an embodiment herein includes: a processor; and a memory for storing instructions.

The instructions are executable by the processor for:

establishing an association logic that associates a non-text message type with specified information, the association logic including at least identification of the non-text message type, allowing a message type in line with the association logic to be identified by the identification;

monitoring a first message;

obtaining a first identification corresponding to the first message by analysing the first message;

detecting, according to the first identification, whether the first message is of the message type in line with the association logic; and determining that the first message supports display of the specified information when it is detected that the first message is of the message type in line with the association logic.

According to an embodiment herein, a non-transitory computer-readable storage medium has stored therein computer-executable instructions that, when executed by a processor, cause the processor to execute the information processing method.

An information processing method according to an embodiment herein applies to a terminal. The method includes steps as follows. An association logic that associates a non-text message type with specified information is established. The association logic includes at least identification of the non-text message type, allowing a message type in line with the association logic to be identified by the identification. A first message is monitored. A first identification corresponding to the first message is obtained by analysing the first message. It is detected, according to the first identification, whether the first message is of the message type in line with the association logic. It is determined that the first message supports display of the specified information when it is detected that the first message is of the message type in line with the association logic.

With embodiments herein, it may be identified, according to a monitored first message and detection of an association logic, whether the first message supports display of specified information, such that display of specific information may be supported by various message types, expanding the scope of applying information display, meeting increasingly diversified user demands for displaying shared information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Implementation of a technical solution herein will be further elaborated below with reference to the drawings.

Figure 1:
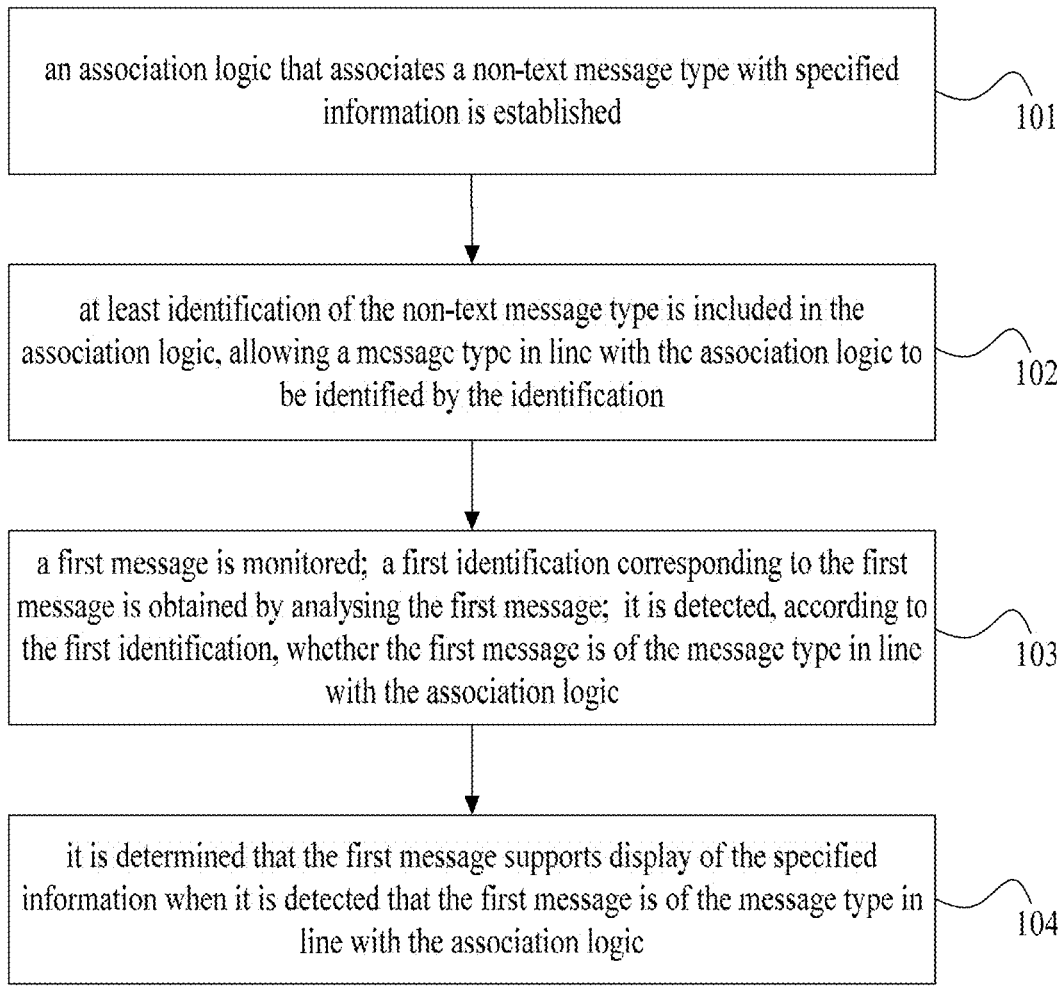
FIG. 1 is a flowchart of a Method Embodiment 1 herein.

An information processing method according to an embodiment herein applies to a terminal. As shown in FIG. 1, the method includes steps as follows.

In step 101, an association logic that associates a non-text message type with specified information is established.

In step 102, at least identification of the non-text message type is included in the association logic, allowing a message type in line with the association logic to be identified by the identification.

Here, the association logic may include further logic content as mentioned below.

In step 103, a first message is monitored; a first identification corresponding to the first message is obtained by analysing the first message; it is detected, according to the first identification, whether the first message is of the message type in line with the association logic.

In step 104, it is determined that the first message supports display of the specified information when it is detected that the first message is of the message type in line with the association logic.

With an embodiment herein, after the identification and the association logic in steps 101-102 are configured, in steps 103-104, it may be determined whether the first message supports the display of the specified information, allowing trigger of displaying specific information with a non-text message type, such that display of specific information may be supported by various message types, expanding the scope of applying information display, meeting increasingly diversified user demands for displaying shared information.

Figure 6:
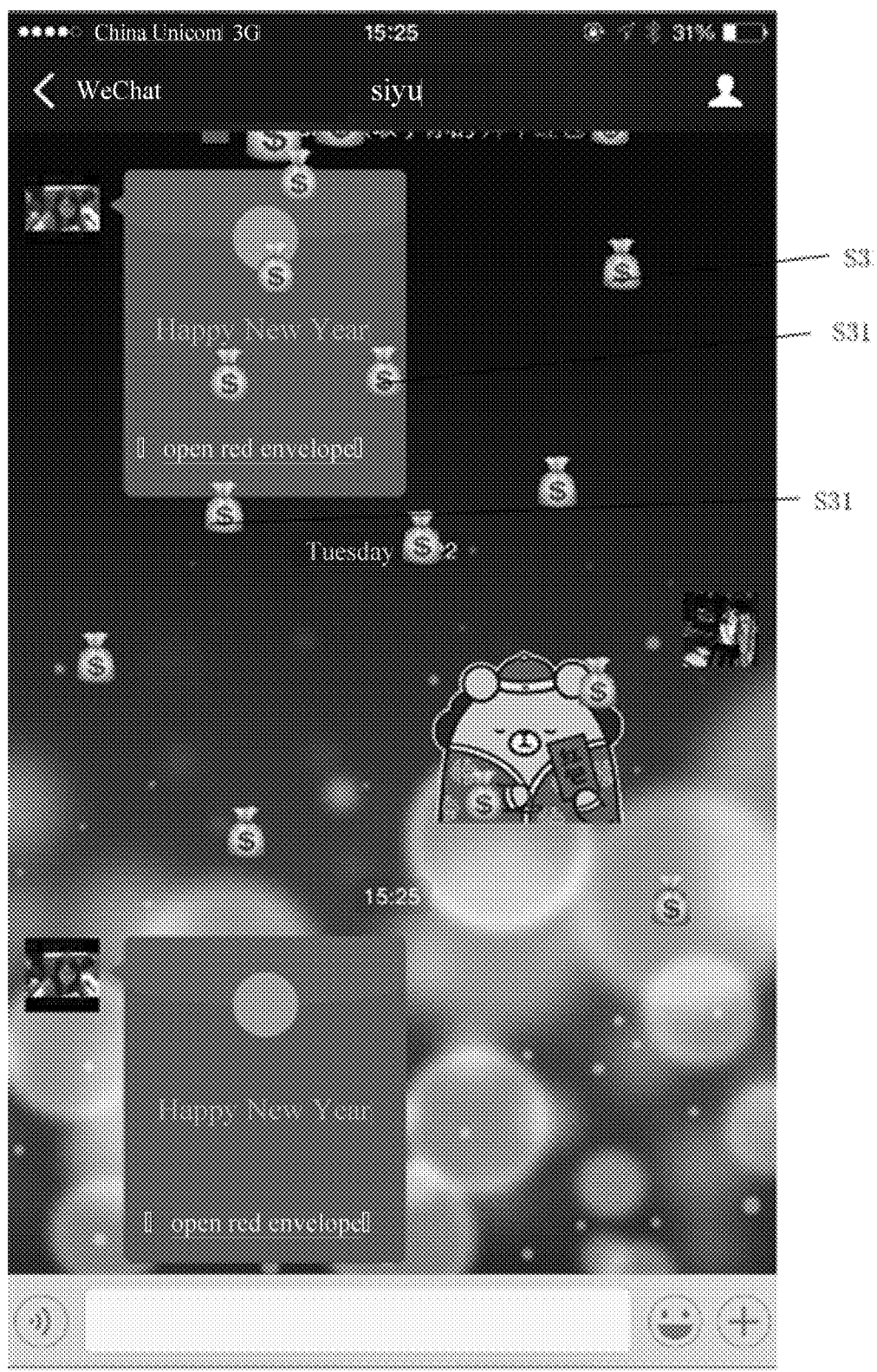
FIG. 6 is a diagram of a scene of applying an embodiment herein.

Here, the display of the specified information may be dropping moneybags 'emoji' (or eggs, as shown in FIG. 6) as described in an application scene below, where the first message may be an open-red-envelope message. Special effects of egg dropping may not be triggered merely by the presence of the open-red-envelope message. An operation to open a red envelope may be further triggered (such as by a screen touching move) in a page displaying the open-red-envelope message, such that display of specific information may be triggered with a non-text message type, and dropping of the moneybags 'emoji', that is, the eggs, may actually be triggered by the operation to open a red envelope.

Figure 2:
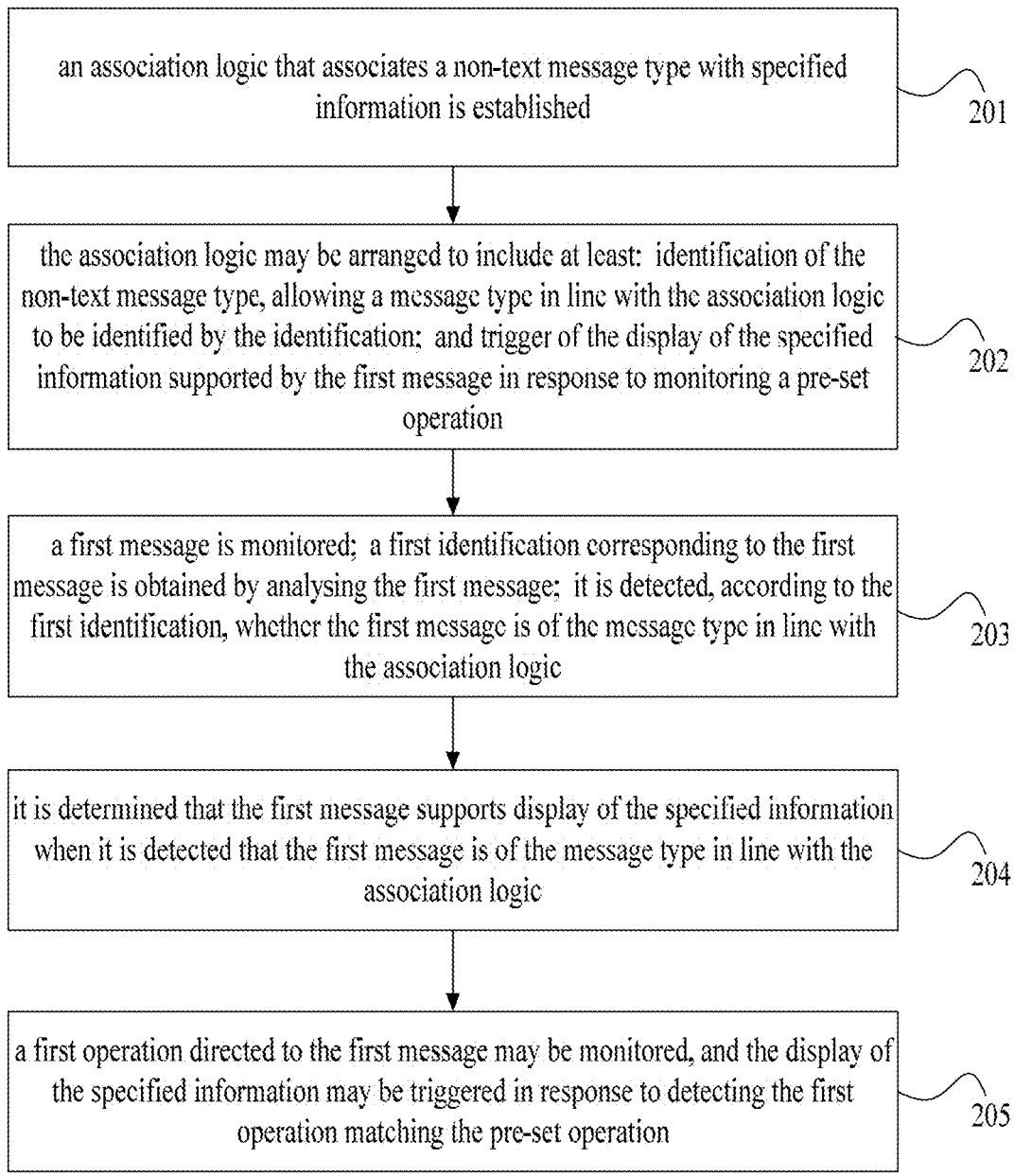
FIG. 2 is a flowchart of a Method Embodiment 2 herein.

An information processing method according to an embodiment herein applies to a terminal. As shown in FIG. 2, the method may include steps as follows.

In step 201, an association logic that associates a non-text message type with specified information is established.

In step 202, the association logic may be arranged to include at least: identification of the non-text message type, allowing a message type in line with the association logic to be identified by the identification; and trigger of the display of the specified information supported by the first message after monitoring that a pre-set operation is met.

In step 203, a first message is monitored; a first identification corresponding to the first message is obtained by analyzing the first message; it is detected, according to the first identification, whether the first message is of the message type in line with the association logic.

In step 204, it is determined that the first message supports display of the specified information when it is detected that the first message is of the message type in line with the association logic.

In step 205, a first operation directed to the first message may be monitored, and the display of the specified information may be triggered in response to detecting the first operation matching the pre-set operation.

With an embodiment herein, after the identification and the association logic in steps 201-202 are configured, in steps 203-204, it may be determined whether the first message supports the display of the specified information, allowing trigger of displaying specific information with a non-text message type, such that display of specific information may be supported by various message types, expanding the scope of applying information display, meeting increasingly diversified user demands for displaying shared information. Moreover, with step 205, the display of the specified information may be triggered only when the first operation matches the pre-set operation.

Here, the display of the specified information may be dropping moneybags 'emoji' (or eggs, as shown in FIG. 6) as described in an application scene below, where the first message may be an open-red-envelope message. Special effects of egg dropping may not be triggered merely by the presence of the open-red-envelope message. An operation to open a red envelope may be further triggered (such as by a screen touching move) in a page displaying the open-red-envelope message, such that display of specific information may be triggered with a non-text message type, and dropping of the moneybags 'emoji', that is, the eggs, may actually be triggered by the operation to open a red envelope. That is to say, with the embodiment, timing of dropping emoji eggs associated with a New Year greeting red envelope in a scene of WeChat may be controlled.

In an embodiment herein, the method may further include steps as follows. before the first operation directed to the first message is monitored and the display of the specified information is triggered in response to detecting the first operation matching the pre-set operation, a first parameter may be obtained by detecting a system operating environment of the terminal; an operating mode may be selected according to the first parameter, and processing may be performed by calling a processing logic corresponding to the operating mode. The processing may include at least one of the monitoring, the detecting, and the display.

Here, since terminals such as those of an Android system and an Apple system support different systems and adopt different specific processing logics, such as different monitoring processes and monitoring controls, for monitoring the first operation directed to the first message and triggering the display of the specified information in response to detecting the first operation matching the pre-set operation. For example, the Apple system iOS may call a system UITouch control, create an object having a tapCount attribute, monitor a number of screen touches, i.e., how many times a user touches a screen, capture a clicking operation, and then trigger egg dropping accordingly. For example, the Android system may call a system "OneClickListener" to monitor a number of screen touches, capture a clicking operation, and then trigger egg dropping accordingly, which will be elaborated in an example of an application scene below.

In an embodiment herein, the pre-set operation may include a screen touching operation on an interactive object in a prompt page where the first message is displayed.

Figure 5:
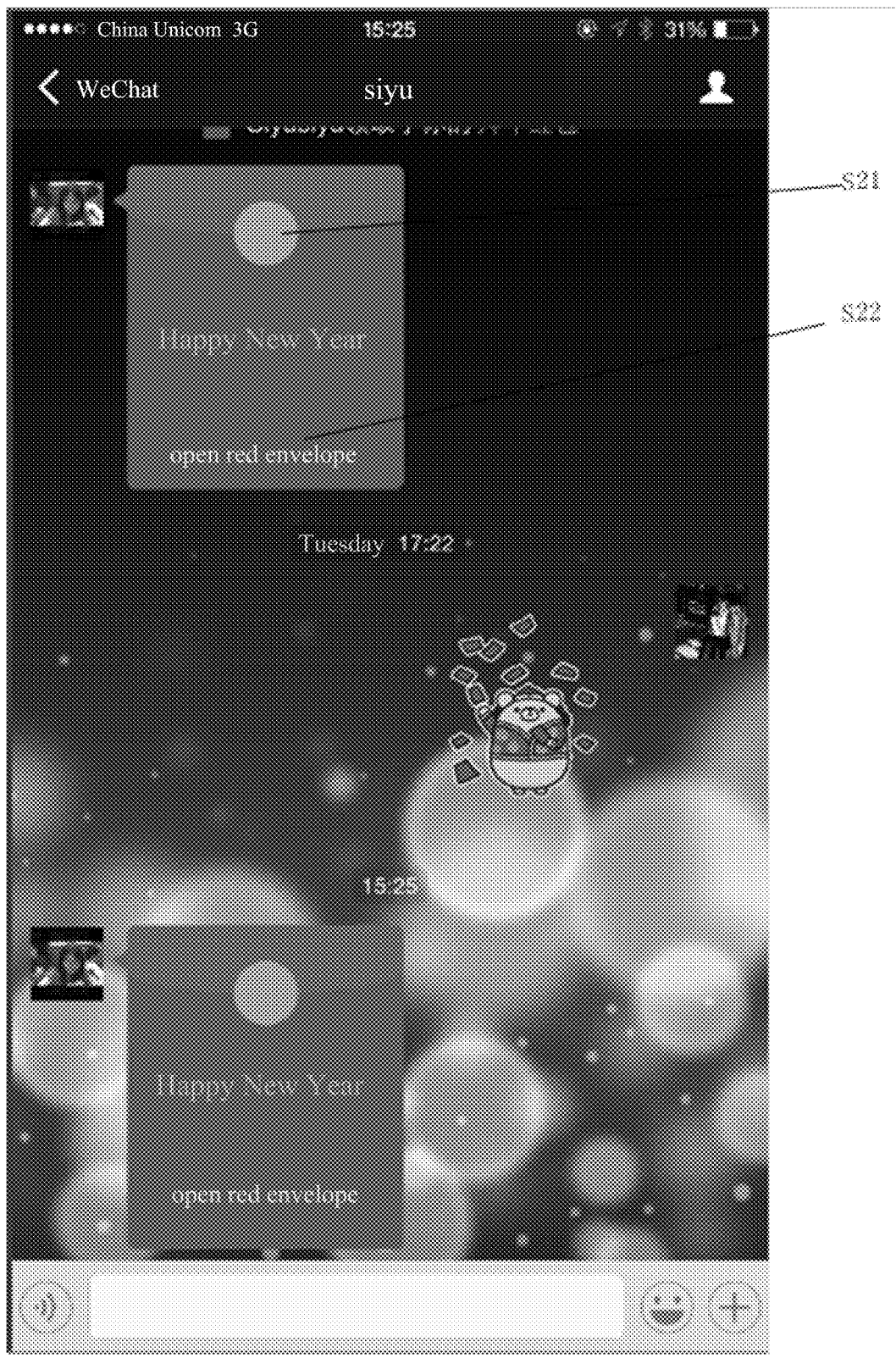
FIG. 5 is a diagram of a scene of applying an embodiment herein.

Here, the interactive object may be an object for triggering interaction such as open-red-envelope or bubble to trigger egg dropping, such as the interactive object S21 or S22 shown in FIG. 5. Eggs may drop in a form as shown by S31 in FIG. 6, which is merely an example. FIG. 6 includes a plurality of eggs.

In an embodiment herein, a specific form in which the specified information is displayed may be controllably adjusted at a terminal. An amount and a speed of dropping emoji eggs associated with a New Year greeting red envelope in a scene of WeChat may be controlled. Specifically, there may be two implementation modes as follows.

In the first mode, one touch operation may be recorded each time a match between the first operation and the pre-set operation is detected;

in response to monitoring a pre-set number of consecutive touch operations, a form in which the specified information is displayed may be changed. The form may include at least one of a displayed amount and a display speed.

The mode is based on multiple touching or pressing operation. For example, provided with a larger number of touches, eggs may drop at a greater speed and/or more eggs may drop. Controllable adjustment may stop when a pre-set upper limit of the number of touches is reached.

In the second mode, in response to detecting the first operation matching the pre-set operation, it may be determined whether a touch strength of the first operation reaches a pre-set pressure value; and in response to determining that the touch strength of the first operation reaches the pre-set pressure value, a form in which the specified information is displayed may be changed. The form may include at least one of a displayed amount and a display speed.

The mode is based on a long hard press. Upon reaching the pre-set pressure value, it may be triggered to drop eggs at a greater speed and/or to drop more eggs. The higher the pressure is, the faster eggs may drop and/or the more eggs may drop. Controllable adjustment may stop upon reaching a pre-set upper limit of pressure.

In an embodiment herein, the first message may be displayed on a user interface of a sender or a receiver;

the display of the specified information may be triggered according to the pre-set operation directed to the first message displayed on the user interface of the receiver.

The first message may be displayed on a user interface of the sender or the receiver. However, display of egg dropping may be triggered only when a user receiving a red envelope confirms an operation to open the red envelope. That is, dynamic egg dropping may be displayed only when it is confirmed that the receiver has opened a red envelope. The embodiment is different from a special situation. With the conventional art, indicated information may be displayed when a text message such as a key word is input at a first user interface of a sender; however, no indicated information will be displayed to a receiver if the text message is not received at a second user interface of the receiver. There is a problem with the conventional art that, after the sender has sent the text message, the text message may be missing or intercepted by a server, the receiver may receive no text message, no information will be shared and displayed to the receiver. The embodiment eliminates such a problem.

Figure 3:
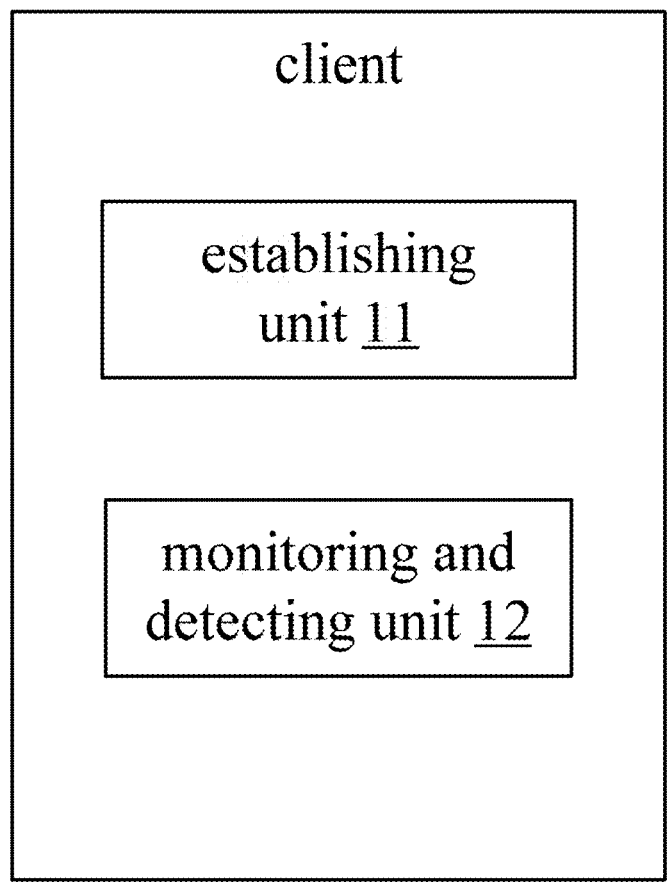
FIG. 3 is a diagram of a structure of Terminal Embodiment 1 herein.

As shown in FIG. 3, a terminal according to an embodiment herein includes:

an establishing unit 11 configured for: establishing an association logic that associates a non-text message type with specified information, the association logic comprising at least identification of the non-text message type, allowing a message type in line with the association logic to be identified by the identification; and a monitoring and detecting unit 12 configured for: monitoring a first message; obtaining a first identification corresponding to the first message by analysing the first message; detecting, according to the first identification, whether the first message is of the message type in line with the association logic; and determining that the first message supports display of the specified information when it is detected that the first message is of the message type in line with the association logic.

In an embodiment herein, the association logic may further include trigger of the display of the specified information supported by the first message in response to monitoring a pre-set operation;

the monitoring and detecting unit may be further configured for: monitoring a first operation directed to the first message, and triggering the display of the specified information in response to detecting the first operation matching the pre-set operation.

In an embodiment herein, the terminal may further include:

a system parameter detecting unit configured for: before monitoring the first operation directed to the first message and triggering the display of the specified information in response to detecting the first operation matching the pre-set operation, obtaining a first parameter by detecting a system operating environment of the terminal; and a processing logic calling unit configured for: selecting an operating mode according to the first parameter, and performing processing by calling a processing logic corresponding to the operating mode; the processing may include at least one of the monitoring, the detecting, and the display.

In an embodiment herein, the monitoring and detecting unit may be further configured for executing a first mode or a second mode;

the first mode may include:

recording one touch operation each time a match between the first operation and the pre-set operation is detected;

in response to monitoring a pre-set number of consecutive touch operations, changing a form in which the specified information is displayed, the form comprising at least one of a displayed amount and a display speed;

the second mode may include:

in response to detecting the first operation matching the pre-set operation, determining whether a touch strength of the first operation reaches a pre-set pressure value; and in response to determining that the touch strength of the first operation reaches the pre-set pressure value, changing a form in which the specified information is displayed, the form comprising at least one of a displayed amount and a display speed.

In an embodiment herein, the monitoring and detecting unit may be further configured for: when the first message is displayed on a user interface of a sender or a receiver, triggering the display of the specified information according to the pre-set operation directed to the first message displayed on the user interface of the receiver.

Note that the terminal may be, but not limited to: electronic equipment such as a Personal Computer (PC); portable electronic equipment such as a PAD, a tablet computer, a laptop, etc.; or a smart mobile terminal such as a mobile phone. The terminal may include at least a database for data storage and a processor for data processing, or include a storage medium arranged separately or in a server.

The processor may be implemented with a microprocessor, a Central Processing Unit (CPU), a Digital Signal Processor (DSP), or a Field-Programmable Gate Array (FPGA). The storage medium may include computer-executable operation instructions that, when executed by a processor, cause the processor to execute the information processing method according to an aforementioned embodiment herein.

Figure 4:
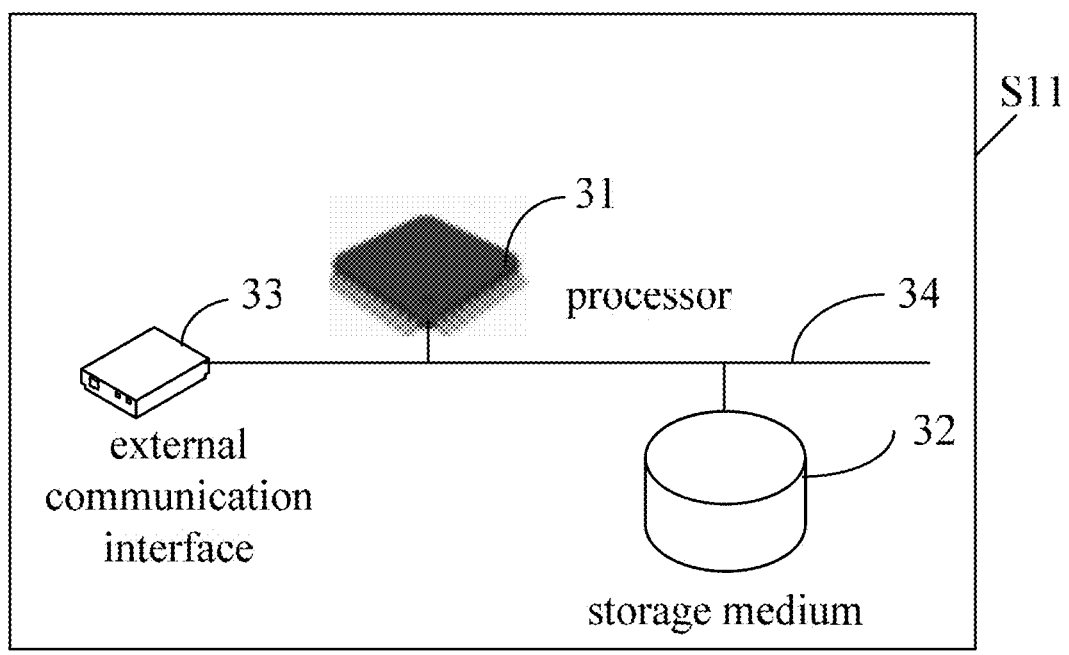
FIG. 4 is a diagram of hardware architecture of a terminal according to an embodiment herein.

An example of the terminal as a hardware entity S11, as shown in FIG. 4, may include a processor 31, a storage medium 32, and at least one external communication interface 33. The processor 31, the storage medium 32 and the external communication interfaces 33 are connected to each other by a bus 34.

Note that the above description relating to the terminal is similar to that relating to the method, with the same beneficial effect as the method, which is not repeated. One may refer to description in the method embodiments herein for technical details not disclosed for the terminal herein.

Description is made below with reference to a real application scene as an example.

The above embodiments herein may apply to a solution for triggering dropping of emoji chat eggs in a New Year greeting red envelope in a WeChat chat. The emoji chat eggs may drop as emoji (facial) expressions in a chat interface. The timing, amount, and speed of the dropping emoji expressions in the scene may be adjusted controllably.

With the conventional art, chat egg dropping may be triggered only with a text message in a WeChat window. When a user sends a message, the terminal searches each text message for a key word, triggering an egg logic with a search hit. Upon entering the chat window, the user will see egg dropping. A problem with the conventional art may be as follows. 1) A trigger condition is limited by a single text message type, that is, key word search triggering chat egg dropping is limited to a common text message. Actually, WeChat as a most common communication tool, has highly diversified message types, with users tending to express themselves using various message types. 2) Timing of egg dropping is limited to when a user enters a chat window, and both the number and the speed of dropping eggs are limited, with no interaction between the user and the information.

With the embodiments herein, the application scene may mainly include specific implementations as follows.

First, chat egg dropping may be triggered with a non-text message type as follows.

A terminal may mark and name a message type in a chat, add an association logic that associates a non-text message type with chat egg dropping, and further with a specific emoji expression. When a user sends a message, the terminal may trigger egg dropping when a message type associated with chat egg dropping is monitored or detected.

Here, an actual application scene, such as a red envelope scene, may include a 'New Year greeting red envelope'. The terminal may mark a red envelope message type, and associate a 'New Year greeting red envelope' message with moneybag emoji, namely egg, dropping, thereby enabling trigger of chat egg dropping by the 'New Year greeting red envelope'.

Second, personalized adjustment of the number and speed of dropping chat eggs may be supported.

When associating a specific message type with the emoji egg, a personalized configuration for display of egg dropping, such as personalized display of egg dropping, a speed and a number of dropping eggs, may be provided.

The monitoring operation may be implemented as follows. For an Apple iOS, a system UITouch control may be called to create an object having a tapCount attribute, monitor a number of screen touches, capture a clicking operation, and then trigger emoji egg dropping accordingly. For an Android system, a system "OneClickListener" may be called to monitor a number of screen touches, capture a clicking operation, and then trigger egg dropping accordingly.

Third, timing of chat egg dropping may be controlled.

Instead of using the default logic of triggering egg dropping upon entering a chat window, the terminal may monitor a specific operation on the chat window and set a timing of chat egg dropping after the specific operation.

An actual application scene may include that the terminal monitors a click on 'open red envelope' on the screen, which move serves as a trigger for egg dropping.

To sum up, the embodiments herein may apply to the scene of display of egg dropping, where eggs in a New Year greeting red envelope in a WeChat terminal are implemented as emoji expressions. A click on a red envelope bubble message in a chat window of WeChat may be monitored, after which chat egg dropping may be triggered. In addition, a timing, a pattern, a speed, etc., of dropping chat eggs may be adjusted, increasing the scope of applicable scenes, supporting trigger of chat egg dropping with different message types in a WeChat scene, increasing fun in WeChat communication, providing more flexible application scenes for emoji expressions.

An integrated module or unit according to embodiments herein, when implemented in form of a software functional module or unit and sold or used as a separate product, may be stored in a computer readable storage medium. Based on such understanding, those skilled in the art shall understand that embodiments herein may be provided as a method, a system or a computer program product. Thus, the present disclosure may take on a form of complete hardware, complete software or a combination thereof. The present disclosure may take on a form of a computer program product implemented on one or more computer available storage media containing computer available program codes. The storage media may include, but are not limited to, a U disk, a mobile hard disk, a Read-Only Memory (ROM), a disk memory, a Compact Disc (CD)-ROM, an optical memory and the like.

The present disclosure has been described with reference to a flowchart and/or a block diagram of the method, device (system) and computer program product according to embodiments herein. It will be appreciated that each flow and/or block in the flowchart and/or the block diagram and a combination of the flows and/or the blocks in the flowchart and/or the block diagram may be implemented by computer program instructions. Such computer program instructions may be provided in a general-purpose computer, a dedicated computer, an embedded processor or a processor of another programmable data processing device to generate a machine, such that an apparatus for implementing functions designated in one or more flows in the flowchart and/or one or more blocks in the block diagram may be generated via instructions executed by the computer or the processor of the another programmable data processing device.

Such computer program instructions may also be stored in a computer readable memory capable of guiding a computer or another programmable data processing device to work in a specific mode, such that a manufactured product including an instruction apparatus is generated via the instructions stored in the computer readable memory, for implementing the functions designated in one or more flows of the flowchart and/or one or more blocks of the block diagram.

Such computer program instructions may also be loaded to a computer or another programmable data processing device, such that a series of operating steps are executed on the computer or the another programmable data processing device to generate computer implemented processing, such that the instructions executed on the computer or the another programmable device provide steps for implementing functions designated in one or more flows of the flowchart and/or one or more blocks of the block diagram.

Although embodiments herein have been described, once learning the basic creative concept herein, those skilled in the art may change and modify such embodiments. Thus, the appended claims are intended to be interpreted as covering the embodiments and all changes and modifications falling within the scope of the present disclosure.

An embodiment herein may also provide a non-transitory computer-readable storage medium having stored therein computer-executable instructions that, when executed by a processor, cause the processor to execute the information processing method according to an embodiment herein.

With embodiments herein, it may be identified, according to a monitored first message and detection of an association logic, whether the first message supports display of specified information, such that display of specific information may be supported by various message types, expanding the scope of applying information display, meeting increasingly diversified user demands for displaying shared information.

What is claimed is:

1. An information processing method performed by a terminal including at least one processor, the information processing method comprising:
   establishing, by the terminal, an association logic that associates a non-text message type with specified information, the association logic comprising at least identification of the non-text message type, allowing a message type in line with the association logic to be identified by the identification;
   monitoring, by the terminal, a first message that has been received;
   obtaining, by the terminal, a first identification corresponding to the first message by analysing the first message;
   detecting, by the terminal according to the first identification, whether the first message is of the message type in line with the association logic;
   determining, by the terminal, that the first message supports display of the specified information when it is detected that the first message is of the message type in line with the association logic;
   displaying, by the terminal, an interactive object that corresponds to the first message and an icon indicating a sender of the first message;
   monitoring, by the terminal, a user input operation, performed after the first message is received, that is directed to the first message;
   triggering, by the terminal, the display of the specified information while maintaining display of the interactive object corresponding to the first message and the icon indicating the sender of the first message in response to detecting the user input operation matching a pre-set operation; and
   controlling, by the terminal, a number of objects concurrently displayed as the specified information based on a number of consecutive touch operations.

2. The method according to claim 1, further comprising: before the monitoring the user input operation directed to the first message,
   obtaining, by the terminal, a first parameter by detecting a system operating environment of the terminal; and
   selecting, by the terminal, an operating mode according to the first parameter, and performing processing by calling a processing logic corresponding to the operating mode, the processing comprising at least one of the monitoring, the detecting, and the display.

3. The method according to claim 1, wherein the pre-set operation comprises a screen touching operation on the interactive object in a prompt page where the first message is displayed.

4. The method according to claim 3, further comprising: recording, by the terminal, one touch operation each time a match between the user input operation and the pre-set operation is detected;
   in response to monitoring a pre-set number of consecutive touch operations, changing, by the terminal, a form in which the specified information is displayed, the form comprising at least one of a displayed amount or a display speed.

5. The method according to claim 3, further comprising:
   in response to detecting the user input operation matching the pre-set operation, determining, by the terminal, whether a touch strength of the user input operation reaches a pre-set pressure value; and
   in response to determining that the touch strength of the user input operation reaches the pre-set pressure value, changing, by the terminal, a form in which the specified information is displayed, the form comprising at least one of a displayed amount or a display speed.

6. The method according to claim 1, wherein the display of the specified information is triggered according to the pre-set operation directed to the first message displayed on a user interface.

7. The method according to claim 1, wherein the objects that are concurrently displayed comprise a plurality of emojis displayed over a page comprising the interactive object.

8. A terminal, comprising:
   at least one memory configured to store computer program code; and
   at least one processor configured to access the at least one memory and operate as instructed by the computer program code, the computer program code including:
      establishing code configured to cause the at least one processor to establish an association logic that associates a non-text message type with specified information, the association logic comprising at least identification of the non-text message type, allowing a message type in line with the association logic to be identified by the identification;
      monitoring code configured to cause the at least one processor to monitor a first message that has been received;
      obtaining code configured to cause the at least one processor to obtain a first identification corresponding to the first message by analysing the first message;
      detecting code configured to cause the at least one processor to detect, according to the first identification, whether the first message is of the message type in line with the association logic;
      determining code configured to cause the at least one processor to determine that the first message supports display of the specified information when it is detected that the first message is of the message type in line with the association logic;
      displaying code configured to cause the at least one processor to display an interactive object and that corresponds to the first message and an icon indicating a sender of the first message;
      monitoring code configured to cause the at least one processor to monitor a user input operation, performed after the first message is received, that is directed to the first message; message; and triggering code configured to cause the at least one processor to trigger the display of the specified information while maintaining display of the interactive object corresponding to the first message and the icon indicating the sender of the first message in response to detecting the user input operation matching a pre-set operation; and controlling code configured to cause the at least one processor to control a number of objects concurrently displayed as the specified information based on a number of consecutive touch operations.

9. The terminal according to claim 8, wherein the computer program code further comprises:

obtaining code configured to cause the at least one processor to obtain, before monitoring the user input operation directed to the first message, a first parameter by detecting a system operating environment of the terminal; and selecting code configured to cause the at least one processor to select an operating mode according to the first parameter, and perform processing by calling a processing logic corresponding to the operating mode, the processing comprising at least one of processing performed based on the monitoring code, the detecting code, and the display code.

10. The terminal according to claim 8 wherein the pre-set operation comprises a screen touching operation on the interactive object in a prompt page where the first message is displayed.

11. The terminal according to claim 10, wherein the computer program code further comprises: processor is further configured for:

recording code configured to cause the at least one processor to record one touch operation each time a match between the user input operation and the pre-set operation is detected; and changing code configured to cause the at least one processor to, in response to monitoring a pre-set number of consecutive touch operations, change a form in which the specified information is displayed, the form comprising at least one of a displayed amount or a display speed.

12. The terminal according to claim 10, wherein the computer program code further comprises:

determining code configured to cause the at least one processor to, in response to detecting the user input operation matching the pre-set operation, determine whether a touch strength of the user input operation reaches a pre-set pressure value; and changing code configured to cause the at least one processor to, in response to determining that the touch strength of the user input operation reaches the pre-set pressure value, change a form in which the specified information is displayed, the form comprising at least one of a displayed amount or a display speed.

13. The terminal according to claim 8, wherein the display of the specified information is triggered according to the pre-set operation directed to the first message displayed on a user interface.

14. The terminal according to claim 8, wherein the objects that are concurrently displayed comprise a plurality of emojis displayed over a page comprising the interactive object.

15. A non-transitory computer-readable storage medium having stored therein computer-executable instructions that, when executed by a processor, cause the processor to execute an information processing method comprising:

establishing an association logic that associates a non-text message type with specified information, the association logic comprising at least identification of the non-text message type, allowing a message type in line with the association logic to be identified by the identification;

monitoring a first message that has been received;

obtaining a first identification corresponding to the first message by analysing the first message;

detecting, according to the first identification, whether the first message is of the message type in line with the association logic;

determining that the first message supports display of the specified information when it is detected that the first message is of the message type in line with the association logic;

displaying an interactive object and that corresponds to the first message and an icon indicating a sender of the first message;

monitoring a user input operation, performed after the first message is received, that is directed to the first message;

triggering the display of the specified information while maintaining display of the interactive object corresponding to the first message and the icon indicating the sender of the first message in response to detecting the user input operation matching a pre-set operation; and controlling a number of objects concurrently displayed as the specified information based on a number of consecutive touch operations.

16. The non-transitory computer-readable storage medium according to claim 15, wherein the method further comprises: before the monitoring the user input operation directed to the first message, obtaining a first parameter by detecting a system operating environment; and selecting an operating mode according to the first parameter, and performing processing by calling a processing logic corresponding to the operating mode, the processing comprising at least one of the monitoring, the detecting, and the display.

17. The non-transitory computer-readable storage medium according to claim 15, wherein the pre-set operation comprises a screen touching operation on the interactive object in a prompt page where the first message is displayed.

18. The non-transitory computer-readable storage medium according to claim 17, wherein the method further comprises:

recording one touch operation each time a match between the user input operation and the pre-set operation is detected;

in response to monitoring a pre-set number of consecutive touch operations, changing a form in which the specified information is displayed, the form comprising at least one of a displayed amount or a display speed.

19. The non-transitory computer-readable storage medium according to claim 15, wherein the display of the specified information is triggered according to the pre-set operation directed to the first message displayed on a user interface.

20. The non-transitory computer-readable storage medium according to claim 15, wherein the objects that are concurrently displayed comprise a plurality of emojis displayed over a page comprising the interactive object.

\* \* \* \* \*